United States Patent [19]

Kobayashi

[11] Patent Number: 4,657,354
[45] Date of Patent: Apr. 14, 1987

[54] COMPOSITE OPTICAL ELEMENT

[75] Inventor: Hiroshi Kobayashi, Osaka, Japan

[73] Assignee: Minolta Camera Kabushiki Kaisha, Osaka, Japan

[21] Appl. No.: 647,615

[22] Filed: Sep. 5, 1984

[30] Foreign Application Priority Data

Sep. 7, 1983 [JP] Japan .................... 58-165738

[51] Int. Cl.⁴ .................... B32B 3/00; B32B 5/00; G02B 13/18
[52] U.S. Cl. .................... 350/432; 264/1.7; 350/417; 428/442
[58] Field of Search ............ 350/432, 417, 409, 165; 264/1.4, 1.7; 428/442

[56] References Cited

U.S. PATENT DOCUMENTS 4,227,950 10/1980 Spycher .................... 350/417
4,407,880 10/1983 Terao et al. ................ 428/442
4,571,314 2/1986 Suzuki et al. ............... 264/1.7

Primary Examiner—John K. Corbin
Assistant Examiner—Rebecca D. Gass
Attorney, Agent, or Firm—Price, Gess & Ubell

[57] ABSTRACT

A compound type optical element and method for manufacturing thereof are provided, in which two layer are disposed on a substrate of glass, each layer being made of synthetic resin materials of energy radiation hardening type. First layer, disposed on the substrate, is made of a material having a relatively small contraction-hardening distortion, while second layer, disposed on the first layer, is made of a material having a superior durability.

13 Claims, 4 Drawing Figures

COMPOSITE OPTICAL ELEMENT

BACKGROUND OF THE INVENTION

1. Field of the Invention

The present invention relates to a junction or compound type optical element with layers of organic high molecular material on the surface of a glass substrate and also relates to a method for manufacturing it.

2. Description of the Prior Art

Optical elements such as lenses have been formed into desired shapes from glass blocks by grinding and polishing them. Glass material is advantageous in that there are various types of glass material with various refractive indexes and Abbe numbers, and that the glass can be ground and polished to have desired sizes or dimensions with high precision. Although the grinding and polishing of glass enables easy formation of spherical or flat surfaces, it is difficult to form specific surface shapes such as an aspherical surface by grinding and polishing. Hence, such specific surface shapes had to be formed by another method using grinding machines capable of achieving a greater precision, with a result of extremely high cost.

It is also known to form a desired shape by molding synthetic resin materials. This method is advantageous in that, unlike the grinding of the glass materials noted above, it can provide optical elements of desired shapes on a mass production scale at low cost. Nevertheless, it has the following shortcomings: In the first place, it is difficult to obtain synthetic resin materials of desired refractive indexes and desired Abbe numbers as compared with the glass materials. Also, no colored material nor the ones with a low transparency can be used for optical elements such as lenses that are required to transmit light. Moreover, the synthetic resins contract when they are hardened to impair the precision of the size and shape and cause internal distortion which result in degradation in the optical performances. Also, different from the glass materials, most of the synthetic resins lack durability. Thus these problems have so far precluded the optical elements of the synthetic resins to be used for optical products for which a high precision in their shapes are required.

To cope with those problems, compound optical elements were proposed wherein layers of resin materials are formed on an optical substrate e.g., glass-lens (see U.S. Pat. No. 2,464,738 and Japanese laid-open patent publication No. Sho 52-25651). These proposed elements are made by a method wherein a synthetic resin material of semi-polymerized state is interposed or sandwiched between a mold of a desired shape and an optical element, the polymerization is allowed to proceed with and to be completed and then the mold is removed so that the shape of the mold is transferred to the resin material. This method affords a comparatively easy selection of the refraction index as desired by forming the optical substrate with the glass materials. Moreover, as the surface of the optical substrate may be in any shape such as a spherical or flat one that is easily formed by grinding, the optical element can be manufactured at a comparatively low cost.

It is desirable that the synthetic resins to be used in this technique have a short hardening time for the sake of mass production and are not likely to contract upon hardening for achieving high precision transfer or imprinting and for minimizing the optical distortion. Also, because they form the outer surface of optical elements, they must be unaffected by surrounding air, i.e. they must have a high durability against the changes in the temperature and humidity of the air.

Thermo-setting resins such as epoxy resins and photo polymerizable bonding agent such as NOA-60 and Photobond[12] (Brand name) have so far been proposed as the resin material for use in these techniques. Although the thermo-setting resin has superior imprinting characteristics and causes less distortion because of their small contractibility upon hardening, they are not suitable for a mass scale production because they must be heated for a long time at a high temperature for hardening. The hardening time may be shortened if drastically heated at a higher temperature but it may only result in a greater contraction upon hardening.

Conversely, the photo polymerizable bonding agent may be suitable for a mass production because of its capability of hardening in a relatively short time whereas it has a greater contractibility upon hardening and is inferior in durability.

As described above, it is difficult to find optimum synthetic resins for the compound optical elements. Here, to minimize the influence from the contraction upon hardening, it is desirable that the shape of the optical substrate materials resemble that of the surface to be obtained as closely as possible for minimizing the thickness of the synthetic resin layers. A problem, however, exists with this technique in that the difficulty in obtaining a shape approximate to the shape to be attained may increase as the complexity of the shape of the surface to be obtained increases.

SUMMARY OF THE INVENTION

An object of the present invention is to provide an optical element which is suitable for mass production, and which can be formed to have a desired surface shape at a greater precision and has high durability.

Another object of the invention is to provide a novel method of producing such an element without a complicated process and the use of elaborate equipment.

To attain those objects, the optical elements according to the present invention are constructed in such a way that first, a layer of a energy radiation hardening type synthetic resin with a small contraction-hardening distortion is formed on a glass substrate and then another layer of the energy radiation hardening type synthetic resin with a superior durability is formed thereon.

DETAILED DESCRIPTION OF THE PREFERRED EMBODIMENT

Figure 1:
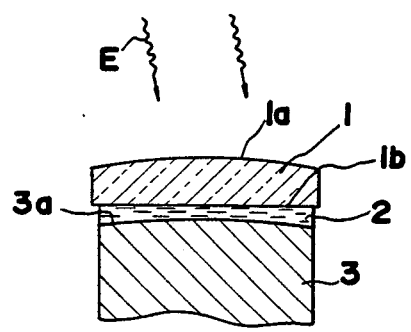
FIGS. 1 to 3 show steps to be taken when producing the optical element of a preferred embodiment of the present invention.
Figure 2:
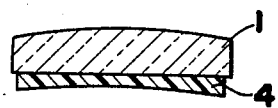
Figure 3:
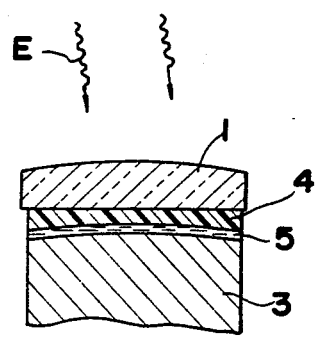

Next, the preferred embodiment of the present invention will be explained in detail with reference to the accompanied drawings. The production of a lens element having an aspherical surface will be tken to be an example in the following description. FIGS. 1 to 3 schematically show the processes for forming the optical elements in accordance with the present invention. In practice, the molding members are supported by appropriate fittings and those locations and spaces between members are also determined by spacers or the like.

In FIG. 1, a substrate 1 is formed of glass. Its top surface 1a is ground into a desired spherical shape and bottom surface 1b is ground into a spherical configuration approximate to an aspherical surface to be finally formed. A metal mold 3 has its top surface 3a formed, in advance, to a desired aspherical shape that is to be formed on the bottom surface 1b of the substrate 1.

Now, as shown in FIG. 1, an appropriate amount of energy radiation hardening type resin material 2 of semi-polymerized fluent form is flowed into the space between the metal mold 3 and the substrate 1, and then the base material 1 is laid on the top of the material 2. Under this condition, the semi-polymerized material 2 is polymerized by applying ultraviolet rays or electronic beams E through the substrate 1. If an external force is applied to the metal mold 3 after the completion of the polymerization, the metal mold 3 can be removed. Upon the completion of these processes, as shown in FIG. 2, the first layer 4 of the energy radiation hardening type resin is fixedly attached on the surface 1b of the substrate 1. Although the semi-polymerized resin 2 may contract upon hardening the influence of the contraction can be minimized by selection of a resin material with a relatively small contraction-hardening distortion. For example, if a resin containing a total of more than 50% of a single function oligoester acrylates and a two-function urethane acrylates is used for the semi-polymerized resin 2, the influence from the contraction-hardening can be minimized resulting in a surface of the first layer 4 having a shape extremely approximate to the desired aspherical surface (the difference in the shape between the two surfaces is approximately 1 μm to 2 μm in the axial direction) with a small internal distortion arising from the contract-hardening distortion. Also, because of a small contraction-hardening distortion, a certain degree of thickness can be given to the first layer 4 so that a configuration approximate to the desired shape can be achieved even when the difference in the shape between the bottom surface 1b of the base material 1 and the upper surface 3a of the metal mold 3 amounts to a certain large extent (approximately 0.2 mm to 0.3 mm in the axial direction). The resins noted above are, however, unsatisfactory with respect to their durability. It is also unadvisable to have them exposed to the open air because they tend to become degraded and damaged due to their hardness.

Figure 4:
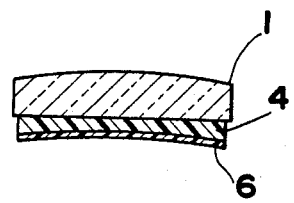
FIG. 4 is a cross-sectional view of the optical elements of the embodiment produced by the process according to the present invention.

Next, as shown in FIG. 3, an appropriate amount of a different type of semi-polymerized material 5 of and energy radiation hardness type resin in fluent form is flowed on the metal mold 3, and the base material 1 on which the first layer 4 has already been formed is laid on top of it. Then if ultraviolet rays or electronic beams E are applied to the semipolymerized material 5 through the substrate 1 and the first layer 4, the semi-polymerized material 5 will be polymerized and hardened. As shown in FIG. 4, if an external force is applied to remove the metal mold 3 after the completion of the polymerization, second layer 6 will be fixedly attached on top of the surface of the first layer 4. If a resin with a superior durability and solidity such as poly-function oligoester acrylates, poly-function urethan acrylates spiro-compound or poly-function exposy acrylates is selectively applied for the resin forming the second layer 6, the surface of the first layer 4 with an inferior durability can be protected. Although the poly-function oligoester acrylate noted above is a resin with a superior durability, its shortcoming is a large contraction-hardening distortion. Consequently, if the thickness of the second resin layer is large and if there is a large difference in the shape between the surface on which this resin layer is fixedly formed (the lower surface of the first layer 4) and metal mold 3, the thickness of the second layer 5 may lack uniformity in its thickness causing a difference in the deviation of dimension arising from the contract-hardening, thereby resulting in a degradation in the dimensional accuracy. This is undesirable from the view point of optical performance, and a large internal stress may also occur inside the second layer itself due to the contraction-hardening and such stress will be a cause of cracks in the layer. In accordance with the present invention, however, the first layer 4 is formed with a resin with a small contraction-hardening distortion and the surface shape of the first layer is made appoximately to a desired final shape. This may allow an extremely thin second layer 6 to be used thereby minimizing the influence from the contraction-hardening, and affording a uniform thickness all over the second layer 6. Thus degradation in the dimensional accuracy due to lack of uniformity in the degree of contraction and hardening can be avoided. Consequently, a surface on the elements with a greater precision and a superior durability can be formed.

Note that although the synthetic resin layers are shown in the Figures, to have large thickness for the purpose of explanation, they are actually very thin in production.

If the semi-polymerized materials 2 and 5 are polymerized by means of radiation of the ultraviolet rays in the embodiments noted above, the use of catalysts that are being marketed with the commercial names of Irgacure 184 (of Civa-Geigey Corporation) and Darocur 1116 (of Merck Corporation) may accelerate the start of polymerization and attain the desired hardening or setting within a period of a few minutes. Thus this method is suitable for production on a mass scale. Because the method using the ultraviolet radiation requires no catalyst and is capable of completing the hardening within a few seconds, it is more desirable.

Supplementing the above explanation, to improve the adhesion between the substrate 1 made of glass and the first layer 4, silane coupling agents such as being marketed under the commercial names of KBM 503 (of Shinetsu Kagaku Kogyo Co.) and MOPS-M (of Chisso Co.) may be suitable for these purposes. When a silane coupling agent diluted by methyl alcohol is applied to the glass surface, the silane coupling agent will adhere to the glass surface and in addition, the glass surface will be activated because of the organic function of the silane coupling agent allowing the resins to adhere easily to it.

Also, on the second layer 6 made of the above polyfunction oligoester acrylates, dielectric substances such as glass, $TiO_2$, $ZrO_2$, $Al_2O_3$, and $MgF_2$ can be coated by means of the noheating vacuum evaporation. Because of a small thermal expansion amount of the oligoester acrylates used for forming the second layer 6, hardly a crack may occur in the coating layers due to the difference in the thermal expansion coefficcient.

Although the above descriptions were made about the as aspherical lens element, needless to say, the present invention can be applied to other various optical elements such as reflecting mirrors besides the lens.

As described above, according to the present invention, the compound optical elements with the polymerized layers on the glass substrate include two polymerized layers of which the first layer in contact with the substrate is composed of a material with a small contraction-hardening distortion, and the second layer with the surface of a desired shape and exposed to the open air is composed of a material with superior durability. This has resulted in an optical element with superior durability and with a greater dimensional precision. Note that if an ultraviolet rays hardening type resin with a high-hardening speed is used as the transparent organic high molecule material, the time required for production can be shortened so that such optical elements are suitable for production on a mass scale.

Also, in the production technique of the compound optical elements constructed by forming the polymerized layers of transparent organic high molecule material on a glass substrate, a two-layer configuration is formed wherein a surface approximate to the desired shape is constructed on a first layer by solidifying the semi-polymerized material after laying a mold of desired shape on a glass substrate via a semi-polymerized material with a small contraction-hardening distortion, and then a second layer to have a surface of a desired shape is formed by solidifying the semi-polymerized material after laying a mold with the same diesired shape as that of the first laying on the above first surface via a semi-polymerized material with superior durability. With this method, the first layer is formed with a material having a small contraction-hardening distortion by employing a mold with a desired shape that may allow to form a surface approximate to the desired shape and the second layer to be formed on this surface can be made into a thin layer with a uniform thickness. Thus a surface can be made into a desired shape with a greater precision even when using a material with a relatively large distortion.

What is claimed is:

1. A composite optical element for use in an image forming system comprising:
   a substrate of a glass material;
   a first thin layer of a first resin material adhered to the glass material substrate, and
   a second thin external layer of a second resin material adhered to the first resin layer and molded into a desired optical surface, the first resin material being characterized by a relatively short setting period and slight contraction during its setting period and the second resin material being characterized by a higher degree of contraction during its setting period and greater hardness than the first layer, both layers include an acrylate resin material having a characteristic that permits hardening upon application of ultraviolet rays, the second layer being thinner than the first layer.

2. The invention of claim 1 wherein the second resin material is a semipolymalized resin material.

3. The invention of claim 1 wherein the first layer is formed of oligoester acrylates and urethane acrylates.

4. The invention of claim 3 wherein the second layer formed of an oligoester acrylate.

5. An optical element, comprising:
   a substrate, made of a glass material, having a base optical surface;
   a first layer, made of a first transparent synthetic resin material having a relatively small contraction-hardening distortion characteristic is adhered to said base optical surface, said first layer having a first optical surface whose configuration is different from the configuration of said base optical surface; and
   a second layer, made of a second transparent synthetic resin material having a relatively superior durability characteristic compared to said first layer and having a substantially constant thickness across said first layer to form a second optical surface of a desired configuration.

6. An optical element as claimed in claim 5, wherein the outer surface of said second layer is aspherical.

7. An optical element as claimed in claim 5, wherein the first synthetic resin material and the second synthetic resin material have a characteristic of being hardened by incident radiation.

8. An optical element as claimed in claim 7, wherein the thickness of said first layer is greater than the thickness of said second layer.

9. An optical element as claimed in claim 7, wherein said first layer is made of a resin containing more than 50% of a single function oligoester acrylates and a two-function urethane acrylates.

10. An optical element as claimed in claim 9, wherein said second layer is made of a resin selection group consisting of a poly-functionality (poly-function) oligoester acrylates, a poly-functionality (poly-function) urethane acrylates, a poly-functionality (poly-function) epoxy acrylates and a spiro-compound.

11. A composite optical element for use in an image forming system, comprising:
    a substrate of a glass material;
    a silane coupling agent on at least one portion of the surface of the glass substrate;
    a first thin layer of a first transparent resin material having a non-uniform thickness and adhered to that portion of the glass material substrate coated with the silane coupling agent, and
    a second thin external layer of a second transparent resin material having a relatively uniform thickness adhered to the first resin layer and molded into a desired optical surface, the first resin material being characterized by a relatively short setting period and slight contraction during its setting period and the second resin material being formed of an acrylate which is characterized by a higher degree of contraction during its setting period and greater hardness than the first layer, the thickness of the second layer being less than the first layer.

12. The invention of claim 11 wherein the first layer is formed of oligoester acrylates and urethane acrylates.

13. The invention of claim 12 wherein the second layer formed of an oligoester acrylate.

* * * * *